United States Patent

[11] 3,619,750

| | | |
|---|---|---|
| [72] | Inventors | Boris Mokrytzki<br>Highland Heights;<br>Peter W. Hammond, Chagrin Falls, both of Ohio |
| [21] | Appl. No. | 863,946 |
| [22] | Filed | Oct. 6, 1969 |
| [45] | Patented | Nov. 9, 1971 |
| [73] | Assignee | Reliance Electric Company |

[54] SPEED COMPENSATION MOTOR CIRCUIT UTILIZING REAL CURRENT COMPONENT
12 Claims, 10 Drawing Figs.

[52] U.S. Cl. ........................................ 318/231, 318/227
[51] Int. Cl. ........................................ H02p 5/40
[50] Field of Search ............................. 318/227, 230, 231

[56] References Cited
UNITED STATES PATENTS

| 3,331,003 | 7/1967 | King | 318/231 |
| 3,402,336 | 9/1968 | Risberg | 318/227 |
| 3,512,067 | 5/1970 | Landau | 318/230 X |

*Primary Examiner*—Gene Z. Rubinson
*Attorney*—Woodling, Krost, Granger and Rust ABSTRACT: An induction motor energization circuit id disclosed with energization from a variable frequency device such as an inverter. The load current to the induction motor has a considerable lagging power factor and a phase-sensitive detector detects only the in-phase or 180° out-of-phase component of this load current and applies it as a control to regulate the variable frequency device. The typical induction motor action is one where the speed droops because the slip increases as the torque increases and may be 2 to 3 percent of base speed. A signal such as the in-phase component of load current which is virtually proportional to torque is used in this invention to correct the frequency output of the inverter by 2 or 3 percent, therefore virtually eliminating the speed or slip error. By the present invention the use of only the real component of the motor load current as a feedback signal results in a substantially constant speed of the motor. The foregoing abstract is merely a resume of one general application, is not a complete discussion of all principles of operation or applications, and is not to be construed as a limitation on the scope of the claimed subject matter.

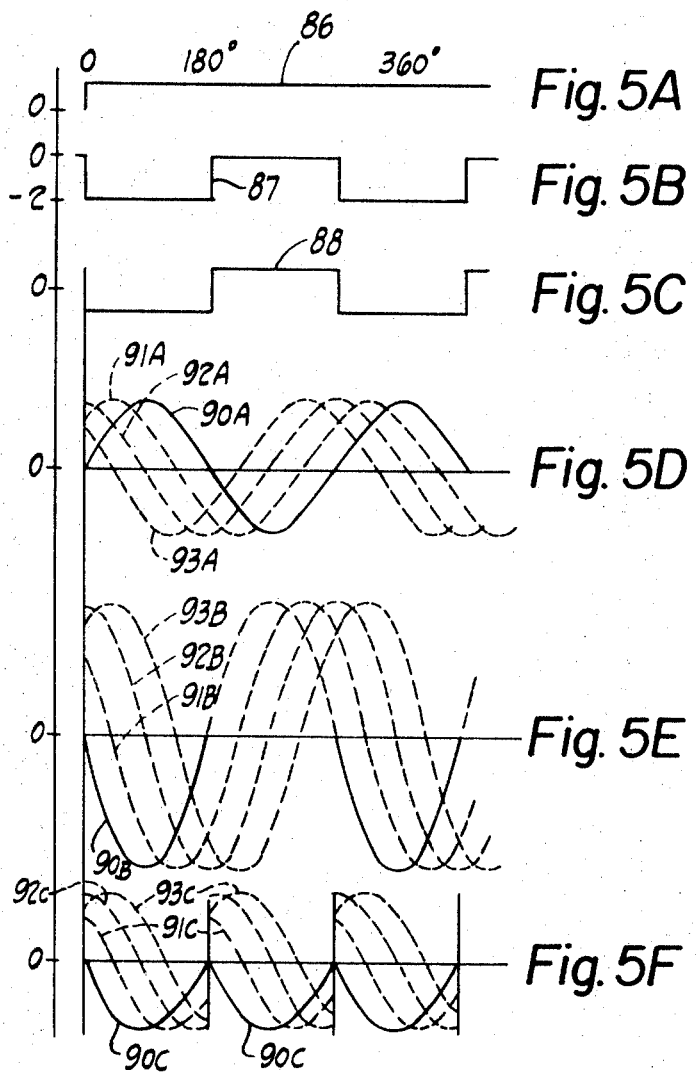

SPEED COMPENSATION MOTOR CIRCUIT UTILIZING REAL CURRENT COMPONENT

BACKGROUND OF THE INVENTION

The typical induction motor operation is thought of as a constant-speed operation because of the usual application of a constant frequency, e.g., 60 Hz. to the motor resulting in a speed proportional to that frequency and inversely proportional to the number of the poles in the motor. For variable speed operation the prior art for many years has used DC motors because of their good variable speed characteristics and good starting torque. However, in many applications such as steel mills, process lines, etc., the atmosphere may be very dusty or corrosive and as a result the DC motor with its commutator and brushes is not only a maintenance problem but actually hazardous because of the arcing at the brushes. The dusty atmosphere causes frequent brush replacement and even frequent turning down of the commutator. In such atmosphere and use conditions, the squirrel-cage induction motor with its absence of arcing, brushes, commutators, and sliprings and its rugged construction is highly desirable. Yet operation from a constant frequency source means that the motor has lower starting torque, high starting current and essentially a constant-speed operation.

In recent years operation of the induction motors from variable frequency devices such as cycloconverters and inverters has come into increasing use in order to obtain a variable speed of operation of the induction motor. The typical circle diagrams and equivalent circuit for induction motors found in textbooks and handbooks are approximations at best, and are approximations based on the premise of operation of the induction motor at a medium frequency, for example, 50 or 60 Hz. This is because the induction motor has been around for decades and for all of its early years was considered essentially a constant frequency, constant-speed device. On inverter drives a speed range of 10:1 is typical and with pulse-width modulation techniques the speed range may be 50:1 or even 100:1. This means that a motor with a 1,750 r.p.m. base speed may be operated down to 175 r.p.m. or even down to as low as 17.5 r.p.m. with PWM techniques. In this invention the speed droop of an induction motor with increasing torque load is compensated by a signal proportional to the real component of the load current. This may be the in-phase component or the 180° out-of-phase component when the motor is being driven by an overhauling load as an induction generator. Typically in an induction motor the motor at no-load runs at almost base speed. This would be about 1,750 r.p.m. for a four-pole motor operating at 60 Hz. The motor slips in order to develop torque. As the torque load increases the slip increases to produce the required torque. This slip is typically small, for example, 2 or 3 percent of base speed even at full load and is virtually proportional to torque. In this invention a signal proportional to the real component of the load current, which is also proportional to torque, is used to correct the frequency output of the inverter by 2 or 3 percent; therefore, greatly reducing and virtually eliminating the speed or slip error. As the motor is driven by an overhauling load for regenerative action, the sense of the speed compensation signal is reversed, that is, a frequency decrease of the inverter with increasing load as the motor feeds energy to the inverter. The present invention eliminates resorting to closed loop techniques such as tachometers and the like, and establishes a speed compensation circuit which gives a constant compensation for speed throughout the frequency of operation of an inverter fed induction motor. This is an improvement as well as a simplification over the tachometer closed loop techniques wherein feedback may introduce dynamic stability problems in a closed loop, high gain, feedback control of speed.

Accordingly an object of the invention is to eliminate undesirable speed droop with increasing motor loads.

Another object of the invention is to provide a speed compensation circuit for a motor which is responsive to only the real component; that is, in-phase of 180° out-of-phase (regenerative) component of the motor load current.

Another object of the invention is to provide a speed compensation circuit which gives a compensation for speed throughout the frequency and load range of operation of an inverter fed induction motor.

Another object of the invention is to provide a phase-sensitive detector to detect between the real component and the reactive component of motor load current.

Another object of the invention is to provide a speed compensation motor circuit to keep speed constant by increasing the frequency with increasing torque for motoring loads proportional to the real component of the motor current and reverses the compensation for overhauling loads driving the motor as an induction generator.

SUMMARY OF THE INVENTION

The invention may be incorporated in a speed compensation circuit comprising, in combination, an induction motor, a variable frequency device connected between voltage source terminals and said motor to supply energy of a variable frequency for variable speed of said motor, regulator means connected to regulate the output frequency of said variable frequency device, phase-sensitive detector means connected to detect the real component of the motor current, and control means connected to be responsive to the in-phase component of the current and connected to control said regulator means.

Other objects and a fuller understanding of the invention may be had by referring to the following description and claims, taken in conjunction with the accompanying drawings.

BRIEF DESCRIPTION OF THE DRAWINGS

FIGS. 5A to 5F are graphs of currents explaining operation of the circuit of FIG. 4.

DESCRIPTION OF THE PREFERRED EMBODIMENT

Figure 1:
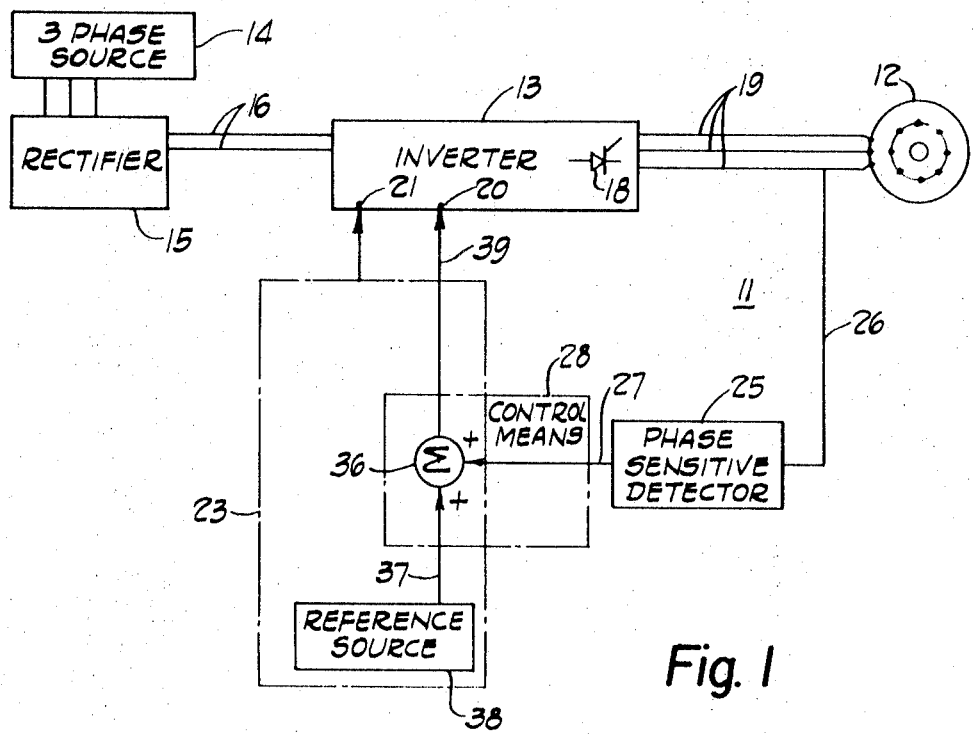
FIG. 1 is a schematic diagram of a motor circuit utilizing the invention.

FIG. 1 shows a schematic diagram of a motor circuit 11 incorporating a preferred embodiment of the invention, however it will be understood from the entire disclosure including the claims that the invention is not limited to this particular form shown in FIG. 1. This motor circuit 11 includes generally a motor 12 shown as an induction motor and this may be a squirrel-cage motor for ruggedness. Also included is a variable frequency device 13 which may be a cycloconverter, for example, but preferably is an inverter. The inverter 13 is supplied with energy from a voltage source 14 shown as a three-phase source supplying energy via a rectifier 15 which in turn supplies direct current energy on conductors 16 to the inverter 13. The inverter 13 may include a plurality of controllable conducting devices such as triacs or thyristors 18 to selectively control the frequency and the voltage of the energy supplied on conductors 19 to the motor 12. In this embodiment these conductors 19 are shown as supplying three-phase energy to the motor 12. The inverter 13 has a frequency control terminal 20 and a voltage control terminal 21 supplied with appropriate signals from a regulator 23. The inverter 13 may be any one of several different conventional types, for example, it may be that shown in the Mokrytzki U.S. Pat. No. 3,391,328 issued July 2, 1968; that in the Mokrytzki application, Ser. No. 624,539 filed Mar. 20, 1967 for PULSE WIDTH MODULATED INVERTER; or that in the Hammond application, Ser. No. 755,927 filed Aug. 28, 1968 entitled SYNCHRONIZING CIRCUIT. In general the inverter 13 has a frequency control signal applied to the control terminal 20 in order to control the frequency of the output of the inverter on the conductors 19 and hence control the speed of operation of the motor 12. Also a voltage control signal applied to the control terminal 21 controls the magnitude of the output voltage and hence controls the torque or load-carrying capabilities of the motor 12.

The motor circuit 11 also includes a phase-sensitive detector means 25 having a feedback 26 from the conductors 19 or the motor 12 sensing the amount of motor current. The phase-sensitive detector means 25 detects the real component of the motor current, that is, either the in-phase or the 180° out-of-phase component of the motor load current and distinguishes this from the reactive component of the load current. The detector means 25 has an output on conductor 27 to a control means 28. This control means 28 includes a summing device 36 which sums the speed compensation signal on conductor 27 and a speed reference signal on another input 37 from a speed reference source 38. The summing device 36 has an output on a conductor 39 to the frequency control terminal 20 to control the speed of the inverter and hence practically eliminates speed droop of the motor 12 with increasing torque load.

The phase-sensitive detector means 25 is sensitive to whether the motor 12 is operating as an induction motor or whether there is regenerative current flowing and this motor is acting as an induction generator. Accordingly the phase-sensitive detector means 25 senses the net in-phase current or the net 180° out-of-phase current, that is, it senses the real component of the current as distinguished from the reactive portion of this current.

Figure 2:
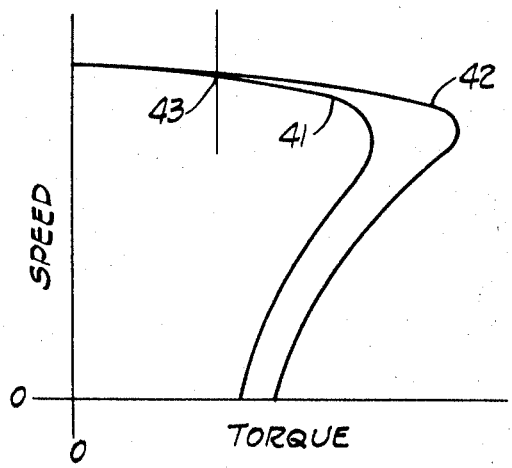
FIGS. 2 and 3 are graphs of operating characteristics of the circuit.
Figure 3:
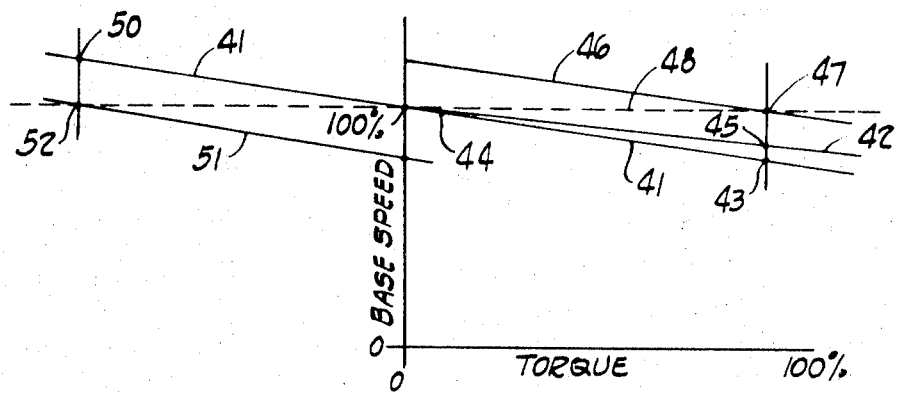

FIG. 2 illustrates a typical speed versus torque curve 41 of an induction motor operating at 100 percent rated motor excitation. Curve 42 may be a typical speed versus torque curve of the same motor with 110 percent of rated motor excitation. Rated load on the motor, for example, might be at a point 43. FIG. 3 shows these curves to an enlarged scale for clarification and shows that there is a typical droop in the speed with increasing torque. At no-load a motor might operate at about point 44 which is operation at close to base speed, except for losses such as windage and friction. The base speed typically may be 1,750 r.p.m. for a four-pole motor operating on 60 Hz. for example.

This droop of the speed-torque curve with increasing torque is small, typically only about 2 percent of the base speed, even at full load. The 110 percent excitation curve 42 shows that even with overexcitation there is still a speed droop at rated load with the motor operating at a point 45 and thus this shows that it is not satisfactory to attempt to eliminate the speed droop by overexcitation. The present invention utilized the real component of the load current as obtained from the phase-sensitive detector 25 to obtain a speed compensation signal. This is summed at the device 36 with the speed reference voltage from source 37 and this applies a small correction at the frequency control terminal 20 to slightly increase the frequency output of the inverter 13. For example, this might be a 2 percent increase in frequency output to operate along a new curve 46 for full load of the motor and hence the motor will have a new operating point at point 47. Actually there will be a family of curves in between curves 41 and 46 and parallel thereto of increasing torques so that the operating point of the motor will lie along a dotted curve 48 which may be considered a locus of operating points between zero and 100 percent torque and beyond, to practically eliminate the speed droop with increasing torque.

Many induction motors are operable as an induction generator when being driven by an overhauling load such as hoist or elevator motors, for example. In such case the motor acts as an induction generator pumping power back to the inverter 13. The portion of the speed torque curve 41 to the left of the ordinate shows normal operation of the motor acting as an induction generator. Just as it had a speed droop characteristic when acting as a motor, it has a rising speed-torque characteristic when operating as a generator. The present invention automatically reverses the speed compensation signal as the motor changes from motoring action to generating action. Accordingly at full-load pumping power back to the inverter the motor 12 would normally act at an operating point 50 on curve 41. However, with the present invention the speed compensation signal is subtracted during regeneration and accordingly the induction generator operates along a curve 51 by slightly decreasing the frequency of the inverter 13 for operation at a point 52 with full-load regeneration. Again there is an entire family of curves parallel to and between curves 41 and 51 so that the locus 48 of operating points extends along a substantially horizontal line to the left of the ordinate for speed compensation during this regenerating action.

The present invention is a simplification as well as an improvement over closed loop techniques involving tachometer feedback from the output of the motor 12. The inverter drive is used, of course, in order to gain the advantage of variable speed operation. In a DC variable speed motor, for example, with a tachometer feedback for speed compensation, the typical operation might be a reference voltage of 100 volts, a tachometer feedback of 99 volts subtracted from the reference to give an error signal of 1 volt. This error signal suitably amplified would control the speed of the DC motor to attempt to maintain it constant. Assuming a sudden 1 percent change in the reference voltage, this could be a 100 percent change in the error signal, and the DC speed regulation system has considerable dynamic stability problems attempting to maintain constant speed of the motor despite such changing input voltage.

Now, however, in the present system there might be a reference voltage of 100 volts and a speed compensation signal of 2 volts and these two, for motoring action, are added rather than subtracted. Accordingly 102 volts is used as a frequency control signal for the inverter 13 to get a slight increase in frequency output of the inverter and thus practically compensate for the speed droop. It will be appreciated that if the reference voltage had a sudden 1 percent change, this changes the control signal only about 1.0 percent instead of 100 percent, not nearly as severe a percentage change on the regulating system as it is with the tachometer feedback system, and accordingly the dynamic stability problems are practically eliminated in the present system.

In the present invention, however, by sensing the real component of the load current, this gives a signal proportional to torque regardless of motor speed. Accordingly the speed compensation signal is effective regardless of what the base speed might be. In the above example 1,750 r.p.m. was given as the base speed but this was only true for 60 Hz. Now where the inverter output is set at 25 Hz., for example, the base speed would be 730 r.p.m. yet the present circuit correctly compensates for the speed droop for this and all other lower frequencies of operation.

Accordingly the present invention has discovered a much more suitable compensating signal by utilizing the in-phase or real component of the motor current. It has been found that the real component or the in-phase component of the motor current is directly proportional to the torque of the motor and accordingly this real component of the motor current is used as a speed compensation signal. The phase-sensitive detector means 25 monitors the motor current and generates a signal proportional to the real component of the load current. This signal is applied to the summing device 36 which sums it with the reference signal to establish the amount of compensation. The reference source 38 may be variable, to establish a variable frequency of operation for the inverter 13 and hence variable speed of the motor 12.

The phase-sensitive detector means 25 may take a number of forms including single and polyphase versions with more or less precision, depending upon the degree of speed or accuracy required. One version is the preferred embodiment shown in FIG. 4. This detector means circuit 25 shown in FIG. 4 includes phase-detector circuits 61, 62 and 63 for each of the three phases of a polyphase source, shown as three phase. These phase detector circuits may be identical and only circuit 61 will be described in detail. Terminals 64, 65 and 66 are phase input terminals carrying current proportional to and directly in phase with current on the conductors 19 to the motor 12. This may be obtained in a number of ways, for example, by use of a small current transformer on each of the conductors 19, or by Hall-effect transducers. Each phase detector circuit 61, 62 and 63 has a first path 67 and a second path 68 leading to a common terminal 69. The first path 67 includes a resistor 71 and the second path 68 includes a second resistor 72 of one-half the ohmic value of resistor 71. Preceding this resistor 72 there is a unity gain inverting operational amplifier 73 which is inverting because of the input to the negative terminal and is unity gain because an input resistor 74 has the same resistance value as a feedback resistor 75. Parallel and oppositely connected diodes 77 protect an FET switch 78 connected in series in the path 68. The switch 78 has a gate 79 connected to be triggered into conduction by a ring counter 80 in synchronism with the phase voltage for that particular phase.

The phase-sensitive detector means 25 also includes an inverting amplifier 81 which amplifies the DC component of the current appearing on terminal 69. A filter capacitor 82 smooths the output voltage of the amplifier 81 appearing on the compensation signal output terminal 27 and a feedback resistor 83 sets the gain of the amplifier 81 which may be a low gain, for example, unity gain.

Figure 4:
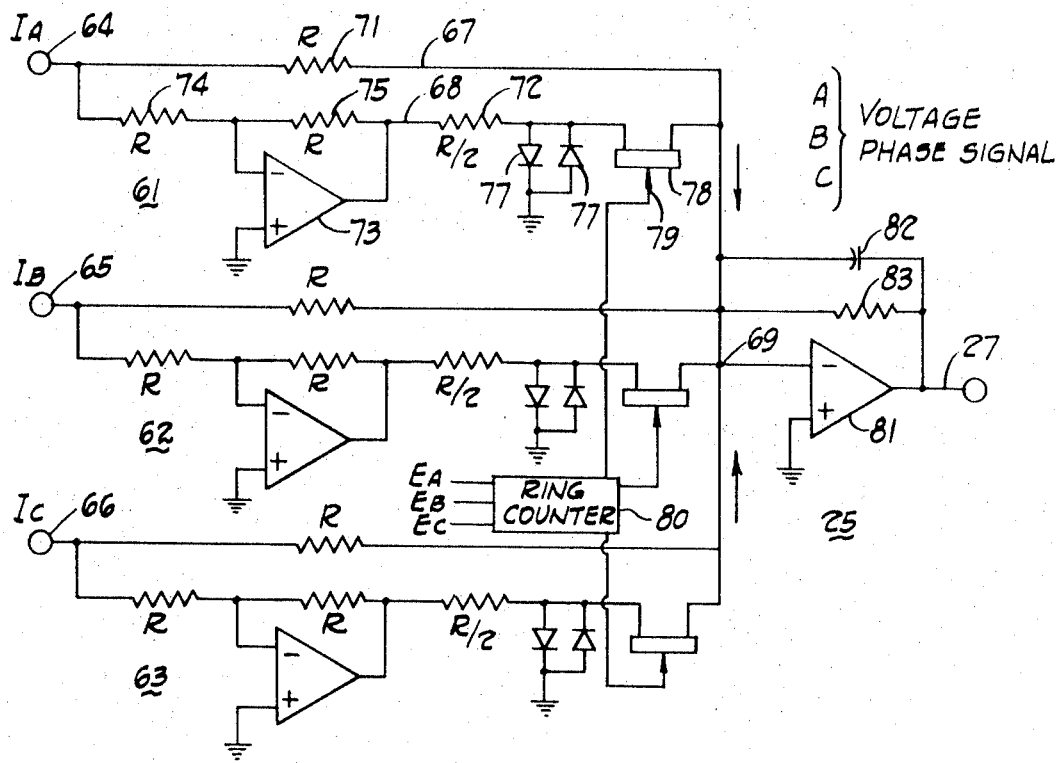
FIG. 4 is a schematic diagram of the preferred embodiment of phased sensitive detector means.

The operation of the phase-sensitive detector means 25 of FIG. 4 may be explained by use of the current diagrams of FIG. 5. Considering just a single-phase detector circuit 61 and assuming for the moment that a direct current is flowing through the two paths 67 and 68, one will observe that in the first path 67 a current will flow equal to $E/R$. Because resistor 72 has only one-half the resistance value of resistor 71, then in this second path 68 a current will flow equal to $-2E/R$. Accordingly FIG. 5A shows a steady DC current 86 equal to $E/R$ will flow in path 67 under this hypothetical situation of a direct current flow. In the second path 68 a current $I=-2E/R$ as shown by curve 87 will flow and this is negative because of the inverting amplifier 73. It is assumed that the current flows only half the time; that is, the switch 78 is open half the time and closed half the time. FIG. 5C shows a resulting curve 88 of a combination of curves 86 and 87 occurring at the common terminal 69 which results from a summation of the currents through the two paths 67 and 68. This is a straight algebraic summation and it shows that the current alternates from a minus to a plus one unit value with the intervals of negative and positive being equal.

With this simplified explanation, next consider FIGS. 5D and 5E and 5F which show a sinusoidal current flow. FIG. 5D shows a curve 90A of current flow through the first path 67, assuming a zero-phase angle between the phase current and the phase voltage, such as $E_A$, which phase voltage triggers the gate 79 of the FET switch 78. FIG. 5E shows a curve 90B of the inverted and doubled current in the second path 68 for the same zero-phase angle. FIG. 5F shows a composite curve 90C which is a summation of the two currents at the terminal 69 of the two curves 90A and 90B. It will be noted that in each half cycle the current curve 90C is a maximum negative and accordingly when inverted by the inverting amplifier 81 will appear as a maximum positive compensation signal at terminal 27.

Next consider a current curve 91A in path 67 which is a 45° lagging current such as is commonly incurred in induction motor operation as an induction motor. Curve 91B in FIG. 5E shows the current through path 68 and curve 91C in FIG. 5F shows the composite current 91C of the current at terminal 69. It will be noted that the average negative current is less than that of the negative current for curve 90C. Next for a 90° lagging current such as occurs during idling of an induction motor with just the magnetization current and no windage and friction losses, then a curve 92A in FIG. 5D shows the current through path 67. FIG. 5E shows a curve 92B of current through path 68 and FIG. 5F shows a curve 92C of the composite current at terminal 69. This is a curve which is equal on both the positive and negative sides of the zero axis and hence when filtered by the capacitor 82, there will be a zero voltage appearing as a compensation signal at the terminal 27. Next consider when the induction motor is regenerating and acting as an induction generator then the current will lag 135°, for example, and a curve 93A will be typical for the current through path 67. Current curve 93B will show the current flow through path 68 and current curve 93C will show the composite current at terminal 69. This is a positive average voltage and when inverted by inverting amplifier 81 it will appear as a definite negative compensation signal at the terminal 27. This shows that the compensation signal changes sign at the proper time; namely, the changeover from motoring action to regenerative action. Accordingly the compensation is subtracted during regeneration and is added during motoring.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangements of parts may be resorted to without departing from the spirit and the scope of the invention as hereinafter claimed.

What is claimed is:

1. A speed compensation circuit comprising, in combination,
   an induction motor,
   a variable frequency device connected between voltage source terminals and said motor to supply energy of a variable frequency for variable speed of said motor,
   regulator means connected to regulate the output frequency of said variable frequency device,
   -phase-sensitive detector means connected to detect only the real component of the motor current,
   and control means connected to be responsive to the in-phase component of the current and connected to control said regulator means.

2. A motor circuit as set forth in claim 1, wherein said variable frequency device is an inverter.

3. A motor circuit as set forth in claim 1, wherein said control means is connected to be responsive to only the in-phase or the 180° out-of-phase component of current of said detector means.

4. A motor circuit as set forth in claim 1, wherein said phase-sensitive detector means includes means to discriminate between the in-phase component and the quadrature-phase component of said motor current.

5. A motor circuit as set forth in claim 1, including a reference signal,
   and means in said control means to combine said reference signal with said real current component to control said regulator means.

6. A motor circuit as set forth in claim 1, wherein said phase-sensitive detector means includes means connected to sense the current to said motor and also includes means to discriminate between the in-phase component and the 180° out-of-phase component of said motor current.

7. A motor circuit as set forth in claim 6, including a reference signal,
   and means in said control means to combine said reference signal with either said in-phase or 180° out-of-phase current component to control said regulator means.

8. A motor circuit as set forth in claim 1, including a motor speed reference source,
   a summing device,
   means to supply said reference source and said in-phase current component to two inputs of said summing device,
   and means connecting the output of said summing device to control said regulator means as a motor speed compensation signal.

9. A motor circuit as set forth in claim 8, including means to sense the difference between motoring current and regenerative current in said motor, and said summing device adding or subtracting, respectively, said speed compensation signal to said regulator according to whether motoring or regenerative current is flowing in said motor.

10. A motor circuit as set forth in claim 1, wherein said phase sensitive detector means includes first and second circuit paths connected in parallel,
resistors in said first and second paths to establish the current flow in said first path at one-half the current flow in said second path,
a unity gain inverting amplifier in said second path to establish a negative current therein,
switch means connected in said second path,
means connected to cause conduction through said switch means of current proportional to motor current in synchronism with the voltage polarity reversals of said variable frequency device,
whereby at the output of said two paralleled paths a current is produced which is proportional to only the in-phase or 180° out-of-phase current.

11. A motor circuit as set forth in claim 1, wherein said motor is a three-phase motor and said variable frequency device is a three-phase supply,
said phase-sensitive detector means including a detector circuit for each phase,
each detector circuit including first and second circuit paths connected in parallel,
an input to each detector circuit from the respective phase current terminal of said variable frequency device,
resistors in said first and second paths to establish the current flow in said first path at one-half the current flow in said second path,
a unity gain inverting operational amplifier in said second path to establish a negative current therein,
a semiconductor switch connected in said second path,
ring counter means connected to trigger said semiconductor switch into conduction in synchronism with the polarity of the voltage of the respective phase becoming positive,
an inverting summing amplifier having an input and an output,
and means to connect the outputs of all three detector circuits to the input of said summing amplifier and the output there of being a motor speed compensation signal proportional to only the in-phase or 180° out-of-phase current.

12. A motor circuit as set forth in claim 1, wherein said variable frequency device is an inverter connected to supply energy of a variable frequency for variable speed of said motor,
voltage control means in said regulator means connected to control the variable frequency of said inverter output,
means connected to sense the current in said motor and connected to said phase-sensitive detector means to have same discriminate between in-phase and quadrature-phase current;
and said control means including a motor speed compensation reference source,
a summing device,
means connecting said motor speed compensation reference source to said summing device,
means connecting the in-phase current output of said phase-sensitive detector to said summing device,
and said summing device algebraicly summing the two inputs and having an output as an error signal connected to said voltage control means for motor speed compensation in accordance with the in-phase or directly out-of-phase component of current in said motor.

* * * * *